United States Patent
Sugino et al.

(10) Patent No.: US 11,750,006 B2
(45) Date of Patent: Sep. 5, 2023

(54) ESTIMATION SYSTEM AND ESTIMATION METHOD

(71) Applicant: TOYOTA JIDOSHA KABUSHIKI KAISHA, Toyota (JP)

(72) Inventors: Yoshiki Sugino, Seto (JP); Kimihito Nakamura, Toyota (JP); Masanari Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 16/999,650

(22) Filed: Aug. 21, 2020

(65) Prior Publication Data

US 2021/0152002 A1  May 20, 2021

(30) Foreign Application Priority Data

Nov. 15, 2019  (JP) .................................. 2019-207193

(51) Int. Cl.
  *H02J 7/00* (2006.01)

(52) U.S. Cl.
  CPC ........ *H02J 7/0049* (2020.01); *H02J 7/00302* (2020.01); *H02J 7/00716* (2020.01); *H02J 7/007182* (2020.01)

(58) Field of Classification Search
  CPC ................. H02J 7/0049; H02J 7/00716; H02J 7/007182; H02J 7/00302
  See application file for complete search history.

(56) References Cited

U.S. PATENT DOCUMENTS

| | | | |
|---|---|---|---|
| 2012/0091969 A1* | 4/2012 | Izumi ...................... | B60L 58/13 320/148 |
| 2016/0318417 A1* | 11/2016 | Suzuki .................... | B60L 53/14 |

FOREIGN PATENT DOCUMENTS

| | | | |
|---|---|---|---|
| JP | 2014-174050 A | | 9/2014 |
| JP | 2014190728 A | * | 10/2014 |
| JP | 2015-114105 A | | 6/2015 |
| JP | 2015-121444 A | | 7/2015 |
| JP | 2018-038248 A | | 3/2018 |

(Continued)

OTHER PUBLICATIONS

Osawa, JP-2014190728-A Machine Translation, Oct. 2014 (Year: 2014).*

*Primary Examiner* — Drew A Dunn
*Assistant Examiner* — Pamela J Jeppson
(74) *Attorney, Agent, or Firm* — Sughrue Mion, PLLC

(57) ABSTRACT

An estimation system, includes: a secondary battery; a monitoring device that detects a voltage and a current of the secondary battery; and a processor that estimates a full charge capacity of the secondary battery using a detection result of the monitoring device. The processor calculates a first charging rate of the secondary battery using a current integration amount in charging, discharging, or charging and discharging of the secondary battery and using a full charge capacity of the secondary battery that was estimated last time; calculates a second charging rate of the secondary battery using an open circuit voltage of the secondary battery, when a predetermined time has elapsed without charging and discharging since the first charging rate is calculated; and performs correction, when a magnitude of a difference between the first and second charging rates is larger than a threshold, on the full charge capacity based on the difference.

10 Claims, 5 Drawing Sheets

(56) References Cited

FOREIGN PATENT DOCUMENTS

WO 2015/082972 A1 6/2015
WO 2015/092521 A1 6/2015

* cited by examiner

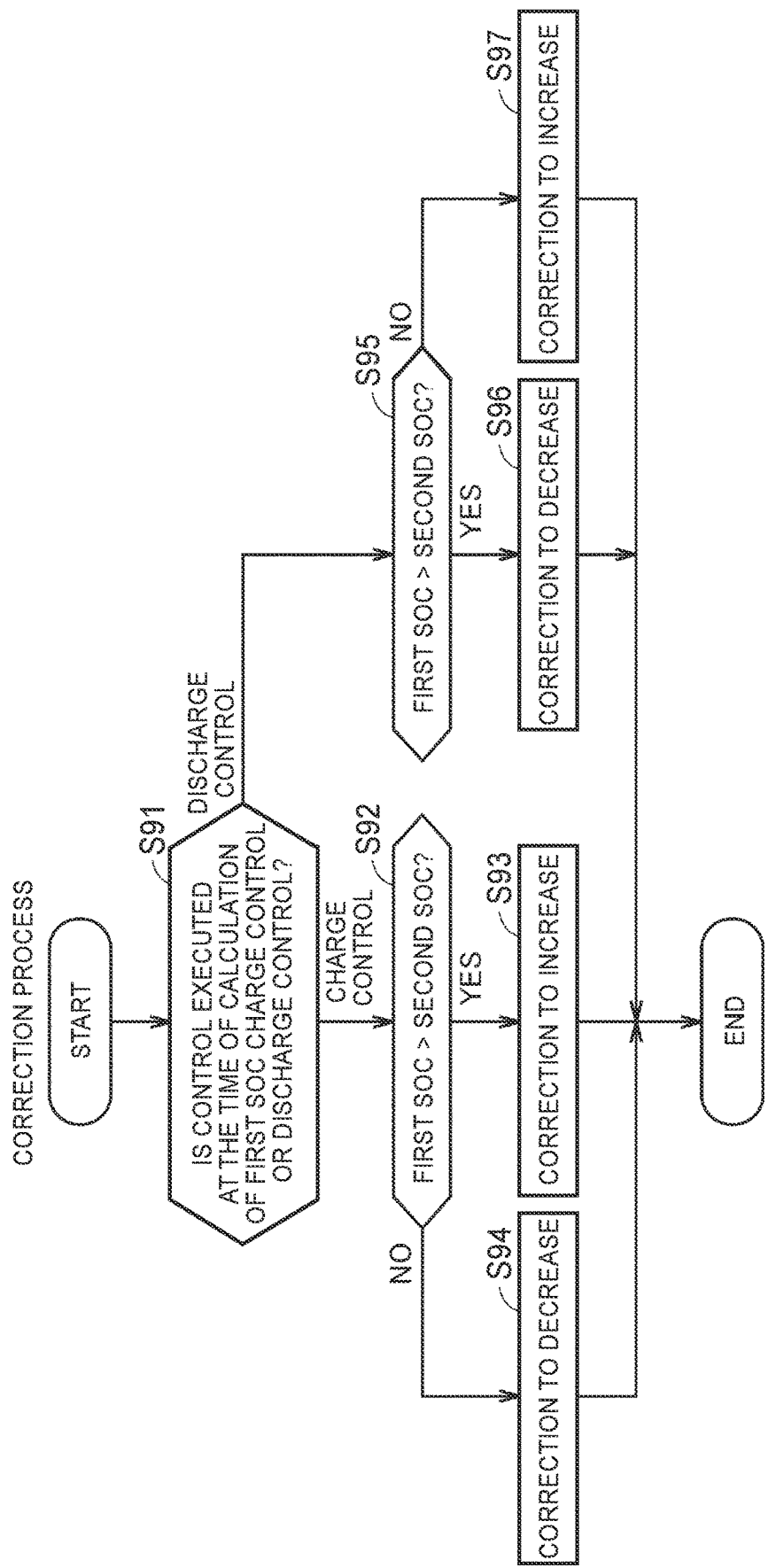

ESTIMATION SYSTEM AND ESTIMATION METHOD

INCORPORATION BY REFERENCE

The disclosure of Japanese Patent Application No. 2019-207193 filed on Nov. 15, 2019 including the specification, drawings and abstract is incorporated herein by reference in its entirety.

BACKGROUND

1. Technical Field

The present disclosure relates to an estimation system and an estimation method for estimating a full charge capacity of a power storage device that is configured to be charged using electric power supplied from an external power source (hereinafter also referred to as "external charging").

2. Description of Related Art

Secondary batteries have been increasingly used as a power source for electric devices. It is known that the secondary battery deteriorates and the full charge capacity of the secondary battery decreases with its use and passage of time. The full charge capacity is used, for example, to calculate drivable times of the electric devices displayed to the user, and thus it is desired to accurately calculate the full charge capacity.

For example, Japanese Unexamined Patent Application Publication No. 2015-121444 (JP 2015-121444 A) discloses a power storage system for estimating the full charge capacity of a secondary battery in consideration of influence of polarization. In the power storage system, in external charging, the amount of change in a state of charge (SOC), which is obtained from a closed circuit voltage (CCV) between two different time points where the amount of voltage change due to polarization converges (saturates), is regarded as the amount of change in the SOC, which is obtained from an open circuit voltage (OCV), to estimate the full charge capacity. Specifically, in a state in which the amount of voltage change due to polarization in the external charging has converged, the external charging is temporarily stopped to acquire a first voltage, and after restarting the external charging, the external charging is again temporarily stopped to acquire a second voltage. In the power storage system, the full charge capacity is calculated using the amount of change in the SOC and a current integration value over a period between the acquisition of the first voltage and the acquisition of the second voltage.

SUMMARY

In the power storage system disclosed in JP 2015-121444 A, in order to acquire the first voltage and the second voltage, the charging is stopped at least twice in the control of charging using external charging. In this case, for example, the time required for the charging may increase by the time required for the process for stopping and restarting the external charging. In the case where the power storage system disclosed in JP 2015-121444 A is applied to the control of discharging for supplying electric power of the secondary battery to the outside as well, it is assumed that the time required for the discharging may increase like the above case.

According to the present disclosure, it is possible to accurately estimate a full charge capacity of a secondary battery without increasing time required for charging or discharging.

A first aspect of the present disclosure relates to an estimation system. The estimation system includes: a secondary battery configured to be charged using electric power supplied from an external power source; a monitoring device configured to detect a voltage and a current of the secondary battery; and a processor programmed to estimate a full charge capacity of the secondary battery using a detection result of the monitoring device. The processor is programmed to: calculate a first charging rate of the secondary battery using a current integration amount in charging, discharging, or charging and discharging of the secondary battery and using a full charge capacity of the secondary battery that was estimated last time; calculate a second charging rate of the secondary battery using an open circuit voltage of the secondary battery, when a predetermined time has elapsed without charging and discharging since the first charging rate is calculated; and perform correction, when a magnitude of a difference between the first charging rate and the second charging rate is larger than a threshold, on the full charge capacity based on the difference.

According to the above configuration, the second charging rate is calculated when a predetermined time has elapsed (if charging and discharging are not performed) since the first charging rate is calculated. The predetermined time is set to a time that allows polarization due to charging or discharging to be eliminated, for example. As the above situation, for example, a case is conceivable that the secondary battery is left as is after external charging, discharging, or traveling and the secondary battery is used after the predetermined time has elapsed. In this case, the processor acquires the open circuit voltage of the secondary battery from the monitoring device before starting to use the secondary battery to calculate the second charging rate. That is, the first charging rate is a value that may be affected by an error due to current integration and polarization or the like due to charging or discharging. The second charging rate is a value in which the influence of polarization is reduced and is considered to be close to the true value. Therefore, when the first charging rate and the second charging rate are significantly different (the magnitude of the difference between the two exceeds the threshold), it is considered that the full charge capacity used for the first charging rate deviates from the true value. Thus, in such a case, the full charge capacity is corrected based on the difference between the first charging rate and the second charging rate.

As a result, even if the full charge capacity deviates from the true value, the full charge capacity can be made close to the true value by the correction. With the above correction, it is not necessary to stop the process partway through charging and discharging, for example. That is, the full charge capacity of the secondary battery can be accurately estimated without increasing the time required for charging or discharging.

In the above aspect, the processor may be programmed to perform correction to increase the full charge capacity based on the difference, when the magnitude of the difference is larger than the threshold and the first charging rate is larger than the second charging rate, in a case where the first charging rate is calculated at a time of charging of the secondary battery.

In the case where the first charging rate calculated at the time of charging of the secondary battery is larger than the second charging rate (by more than the threshold), that is, when "first charging rate−second charging rate>threshold" is satisfied, it is estimated that the full charge capacity is smaller than the true value. Thus, in the above case, the correction is performed to increase the full charge capacity. As a result, the full charge capacity can be made close to the true value, so that the full charge capacity of the secondary battery can be accurately estimated.

In the above aspect, the processor may be programmed to perform correction to decrease the full charge capacity based on the difference, when the magnitude of the difference is larger than the threshold and the first charging rate is smaller than the second charging rate, in a case where the first charging rate is calculated at a time of charging of the secondary battery.

In the case where the first charging rate calculated at the time of charging of the secondary battery is smaller than the second charging rate (by more than the threshold), that is, when "second charging rate−first charging rate>threshold" is satisfied, it is estimated that the full charge capacity is larger than the true value. Thus, in the above case, the correction is performed to decrease the full charge capacity. As a result, the full charge capacity can be made close to the true value, so that the full charge capacity of the secondary battery can be accurately estimated.

In the above aspect, the processor may be programmed to perform correction to decrease the full charge capacity based on the difference, when the magnitude of the difference is larger than the threshold and the first charging rate is larger than the second charging rate, in a case where the first charging rate is calculated at a time of discharging of the secondary battery.

In the case where the first charging rate calculated at the time of discharging of the secondary battery is larger than the second charging rate (by more than the threshold), that is, when "first charging rate−second charging rate>threshold" is satisfied, it is estimated that the full charge capacity is larger than the true value. Thus, in the above case, the correction is performed to decrease the full charge capacity. As a result, the full charge capacity can be made close to the true value, so that the full charge capacity of the secondary battery can be accurately estimated.

In the above aspect, the processor may be programmed to perform correction to increase the full charge capacity based on the difference, when the magnitude of the difference is larger than the threshold and the first charging rate is smaller than the second charging rate, in a case where the first charging rate is calculated at a time of discharging of the secondary battery.

In the case where the first charging rate calculated at the time of discharging of the secondary battery is smaller than the second charging rate (by more than the threshold), that is, when "second charging rate−first charging rate>threshold" is satisfied, it is estimated that the full charge capacity is smaller than the true value. Thus, in the above case, the correction is performed to increase the full charge capacity. As a result, the full charge capacity can be made close to the true value, so that the full charge capacity of the secondary battery can be accurately estimated.

In the above aspect, the processor may be programmed to add a value obtained by dividing the current integration amount by the full charge capacity of the secondary battery that was estimated last time, to a charge amount of the secondary battery at a time of starting of control, to calculate the first charging rate.

In the above aspect, the processor may be programmed to calculate the second charging rate using the voltage of the secondary battery before control is started and an open circuit voltage to state of charge curve for the secondary battery.

A second aspect of the present disclosure relates to a method for estimating a full charge capacity of a secondary battery configured to be charged using electric power supplied from an external power source. The method includes: calculating a first charging rate of the secondary battery using a current integration amount in charging, discharging, or charging and discharging of the secondary battery and using a full charge capacity of the secondary battery that was estimated last time; calculating a second charging rate of the secondary battery using an open circuit voltage of the secondary battery, when a predetermined time has elapsed without charging and discharging since the first charging rate is calculated; and performing correction, when a magnitude of a difference between the first charging rate and the second charging rate is larger than a threshold, on the full charge capacity based on the difference.

In the above aspect, in performing correction on the full charge capacity, the correction may be performed to increase the full charge capacity based on the difference, when the magnitude of the difference is larger than the threshold and the first charging rate is larger than the second charging rate, in a case where the first charging rate is calculated at a time of charging of the secondary battery.

In the above aspect, in performing correction on the full charge capacity, the correction may be performed to decrease the full charge capacity based on the difference, when the magnitude of the difference is larger than the threshold and the first charging rate is smaller than the second charging rate, in a case where the first charging rate is calculated at a time of charging of the secondary battery.

According to the present disclosure, it is possible to accurately estimate a full charge capacity of a secondary battery without increasing time required for charging or discharging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating a procedure of a correction process.

DETAILED DESCRIPTION OF EMBODIMENTS

Figure 1:
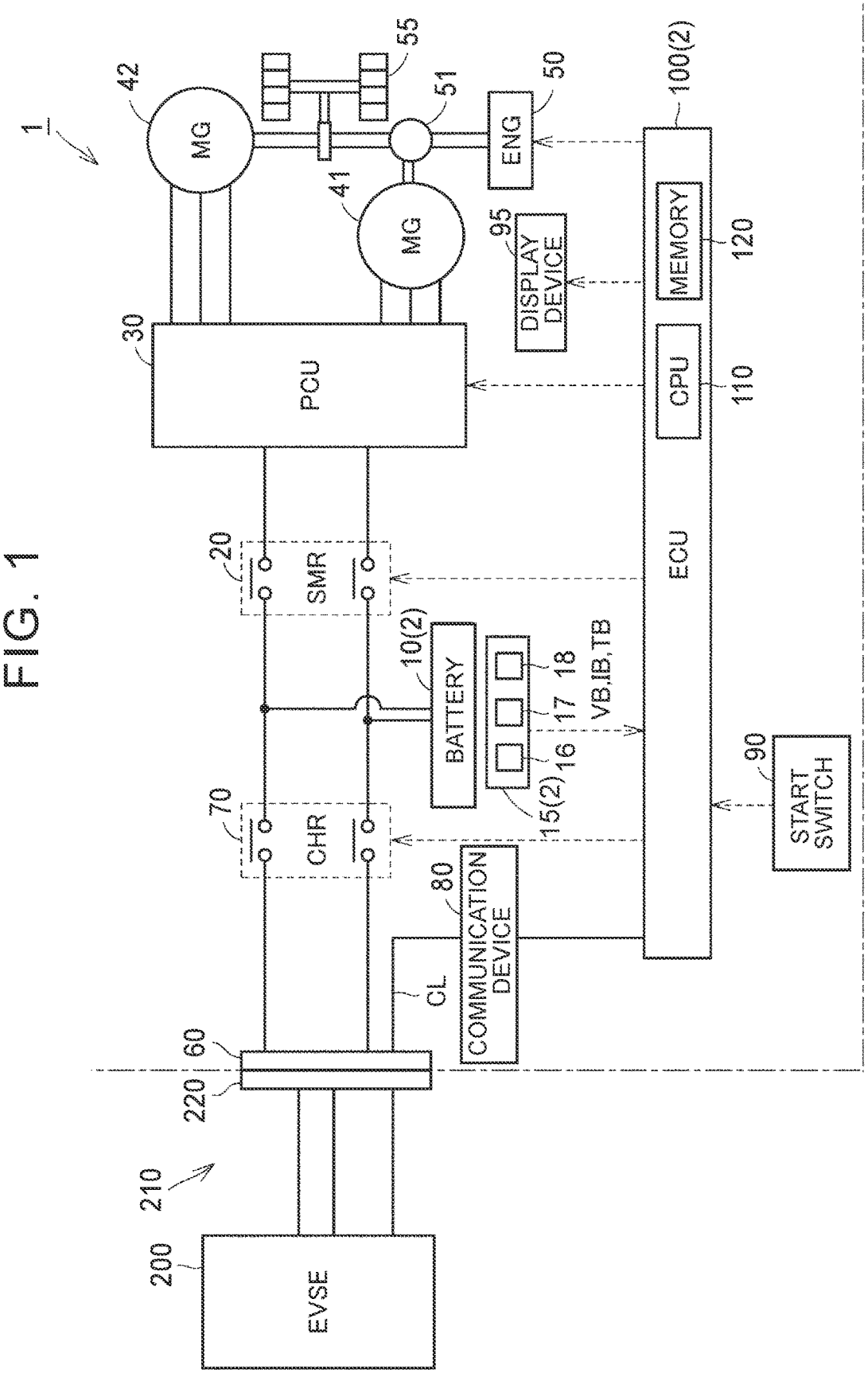
FIG. 1 is an overall configuration diagram of a vehicle on which an estimation system according to an embodiment is mounted.

Hereinafter, embodiments of the present disclosure will be described in detail with reference to the drawings. It should be noted that the same or corresponding parts in the drawings are designated by the same reference characters and repetitive description will be omitted.

Overall Configuration

FIG. 1 is an overall configuration diagram of a vehicle 1 on which an estimation system 2 according to the present embodiment is mounted. The vehicle 1 is a plug-in hybrid vehicle configured to be capable of external charging for charging a battery 10 mounted on the vehicle 1 with electric power supplied from a power source outside the vehicle 1. The vehicle 1 is not limited to a plug-in hybrid vehicle as long as the vehicle 1 allows the external charging of the battery 10. For example, the vehicle 1 may be an electric vehicle or a fuel cell vehicle. In the present embodiment, an example will be described in which the external charging is direct current (DC) charging for charging the battery 10 mounted on the vehicle 1 with electric power supplied from a DC power source outside the vehicle 1. However, the external charging is not limited to the DC charging, and may be alternating current (AC) charging for charging the battery 10 mounted on the vehicle 1 with electric power supplied from an AC power source outside the vehicle 1.

Further, the vehicle 1 according to the present embodiment is a vehicle configured to be capable of "external discharging" for supplying electric power of the battery 10 to the outside of the vehicle 1.

Referring to FIG. 1, the vehicle 1 includes the battery 10, a monitoring unit 15, a system main relay (SMR) 20, a power control unit (PCU) 30, a motor generators 41, 42, an engine 50, a power split device 51, drive wheels 55, a start switch 90, a display device 95, and an electronic control unit (ECU) 100. In the present embodiment, the battery 10, the monitoring unit 15, and the ECU 100 function as the estimation system 2. The vehicle 1 also includes an inlet 60, a charging relay 70, and a communication device 80 as a configuration for performing external charging and external discharging.

The battery 10 is mounted on the vehicle 1 as a drive power source (that is, a power source) of the vehicle 1. The battery 10 includes a plurality of stacked batteries. The battery is, for example, a secondary battery such as a nickel-hydride battery or a lithium-ion battery. Further, the battery may be a battery having a liquid electrolyte between a positive electrode and a negative electrode, or may be a battery having a solid electrolyte between a positive electrode and a negative electrode (all-solid-state battery).

The monitoring unit 15 detects the state of the battery 10. The monitoring unit 15 functions as a monitoring device. Specifically, the monitoring unit 15 includes a voltage sensor 16, a current sensor 17, and a temperature sensor 18. The voltage sensor 16 detects a voltage VB of the battery 10. The current sensor 17 detects a current IB input and output to and from the battery 10. The temperature sensor 18 detects a temperature TB of the battery 10. Each of the above sensors outputs a signal indicating the detection result to the ECU 100. The output of the current sensor 17 has a positive value when the battery 10 is charged, and has a negative value when the battery 10 is discharged.

The SMR 20 is electrically connected to a power line that connects the PCU 30 and the battery 10. When the SMR 20 is in a closed state, electric power is supplied from the battery 10 to the PCU 30. When the SMR 20 is in an open state, electric power is not supplied from the battery 10 to the PCU 30. The SMR 20 is switched between a closed state and an open state in accordance with a control signal from the ECU 100.

The PCU 30 converts DC power stored in the battery 10 into AC power and supplies the AC power to the motor generators 41, 42 in accordance with a control signal from the ECU 100. The PCU 30 also converts AC power generated by the motor generators 41, 42 into DC power and supplies the DC power to the battery 10. The PCU 30 is configured to be able to control the individual states of the motor generators 41, 42. For example, the PCU 30 can bring the motor generator 42 into a power running state while putting the motor generator 41 into a regenerative state. The PCU 30 is configured to include, for example, two inverters provided corresponding to the motor generators 41, 42 and a converter that boosts DC voltage supplied to each inverter to an output voltage of the battery 10 or higher.

Each of the motor generators 41, 42 is an AC rotating electric machine, and for example, a three-phase AC rotating electric machine in which permanent magnets are embedded in a rotor (not shown). The motor generator 41 is coupled to a crankshaft of the engine 50 via the power split device 51. The motor generator 41 uses electric power of the battery 10 to rotate the crankshaft of the engine 50 when the engine 50 is started. Further, the motor generator 41 can also generate electric power using the power of the engine 50. The AC power generated by the motor generator 41 is converted into DC power and supplied to the battery 10 by the PCU 30. Further, the AC power generated by the motor generator 41 may be supplied to the motor generator 42.

The motor generator 42 rotates the drive wheels 55 using at least one of the electric power from battery 10 and the electric power generated by the motor generator 41. The motor generator 42 can also generate electric power by regenerative braking at the time of braking or reduction in acceleration. The AC power generated by the motor generator 42 is converted into DC power and supplied to the battery 10 by the PCU 30.

The engine 50 is, for example, an internal combustion engine such as a gasoline engine or a diesel engine. The engine 50 is controlled by a control signal from the ECU 100.

The power split device 51 is, for example, a planetary gear mechanism having three rotating elements, i.e., a sun gear, a carrier, and a ring gear, and is configured to split power generated by the engine 50 into power to be transmitted to the drive wheels 55 and power to be transmitted to the motor generator 41.

The inlet 60 is configured to be connectable to a connector 220 provided at the tip of a charging cable 210 of electric vehicle supply equipment (EVSE) 200. The inlet 60 is normally covered with a charging lid (not shown). When the charging lid is opened, a user can connect the connector 220 to the inlet 60.

The EVSE 200 is, for example, a charging/discharging facility installed in a home of a user of the vehicle 1 etc. When external charging is performed, the EVSE 200 converts electric power from, for example, a commercial power supply (not shown) into DC power and supplies the DC power to vehicle 1 (inlet 60). When external discharging is performed, the EVSE 200 converts DC power supplied from the vehicle 1, for example, into AC power and supplies the electric power to a power line (not shown) electrically connected to various devices provided in the home or the like. The EVSE 200 is not limited to the charging/discharging facility provided in the home of the user or the like, and may be the charging/discharging facility provided in public places.

The charging relay 70 is electrically connected to a power line connecting the inlet 60 and the battery 10. The charging relay 70 switches between supply and cutoff of electric power between the inlet 60 and the battery 10 in accordance with a control signal from the ECU 100.

The communication device 80 is configured to be able to communicate with the EVSE 200 via a communication signal line CL. Communication between the vehicle 1 (communication device 80) and the EVSE 200 is carried out, for example, by communication according to a communication protocol of Controller Area Network (CAN) (hereinafter also referred to as "CAN communication"). Note that the communication between the vehicle 1 and the EVSE 200 is not limited to the CAN communication, and may be carried out by power line communication (PLC), for example.

The start switch 90 is a switch for accepting a startup operation and a shutdown operation of the system of the vehicle 1. The startup operation is, for example, an operation of pressing the start switch 90 with a brake pedal (not shown) being depressed while the system of the vehicle 1 is not in operation. The shutdown operation is, for example, an operation of pressing the start switch 90 with the shift range being in the parking range while the system of the vehicle 1 is in operation. When the start switch 90 detects that it has been pressed, for example, the start switch 90 outputs a signal indicating that it has been operated to the ECU 100.

The display device 95 displays various information regarding the vehicle 1 in accordance with a control signal from the ECU 100. The information displayed by the display device 95 is, for example, possible traveling distance of the vehicle 1 (EV cruising range), the SOC of the battery 10, the outside temperature, and the like. The SOC indicates, as a percentage, the current amount of stored electricity with respect to the full charge capacity of the battery 10. The display device 95 may be, for example, a navigation device, a multi-information display, or the like, or may be provided as an independent device.

The ECU 100 includes a central processing unit (CPU) 110, a memory 120, and an input/output port (not shown). The ECU 100 may be divided into a plurality of ECUs by function. The memory 120 includes a read-only memory (ROM) and a random access memory (RAM), and stores programs executed by the ECU 100, maps used for various controls, and the like. The CPU 110 loads the programs stored in the ROM into the RAM and executes the programs. The CPU 110 outputs a control signal based on a signal from each sensor and a map stored in the memory 120 and controls each device so that the vehicle 1 is in a desired state.

The main controls performed by the ECU 100 according to the present embodiment include travel control of the vehicle 1, charge control, and discharge control.

Travel Control

When the ECU 100 detects that a startup operation has been performed, the ECU 100 starts the travel control. For example, when the user performs the startup operation on the start switch 90, the ECU 100 starts up each device of the vehicle 1 to bring the SMR 20 into the closed state, so that the vehicle 1 can travel. In the travel control, the ECU 100 calculates a torque request value based on an accelerator operation amount etc., and controls the PCU 30 so that the motor generator 42 outputs a torque corresponding to the torque request value.

In the travel control, the ECU 100 controls the PCU 30 so that the SOC of the battery 10 ranges between a lower limit SOC and an upper limit SOC. The lower limit SOC is a lower limit value of the SOC in the control, and is set as a threshold for suppressing deterioration of the battery 10, for example. The upper limit SOC is an upper limit value of the SOC in the control, and is set as a threshold for suppressing deterioration of the battery 10, for example.

In the travel control, the ECU 100 acquires a detection value from the monitoring unit 15 in a predetermined cycle and calculates the SOC. Specifically, the ECU 100 calculates the SOC of the battery 10 according to the following equation (1).

$$SOC=SOC(0)+(\Sigma IB/FCC) \quad (1)$$

In the above equation (1), SOC(0) represents the SOC of the battery 10 at the time of starting of the travel control, and is specifically the SOC stored in the memory 120. $\Sigma IB$ represents an integrated value of the current IB integrated from the start of the travel control. FCC represents the full charge capacity of the battery 10. The full charge capacity FCC is stored in the memory 120. Details regarding the full charge capacity FCC will be described later.

The ECU 100 executes a termination sequence when a termination condition of the travel control is satisfied. The termination condition of the travel control is, for example, that the shutdown operation is performed. In the termination sequence, the ECU 100 calculates the SOC at the time of ending of the travel control according to the above equation (1). Then, the ECU 100 stores the calculated SOC in the memory 120 of the ECU 100. The SOC stored in the memory 120 of the ECU 100 is used as the SOC at the time of starting of the control (travel control, charge control, or discharge control) performed following the current travel control. Then, the ECU 100 shuts down the system of the vehicle 1 to open the SMR 20 and ends the termination sequence. The SOC at the time of ending of the travel control, which is calculated according to the equation (1), corresponds to an example of a "first charging rate" according to the present disclosure. Further, in the following description, the SOC at the time of ending of the travel control, which is calculated according to the equation (1), is sometimes referred to as "first SOC".

Charge Control

The ECU 100 starts the charge control, when a charge start operation is performed with the connector 220 being connected to the inlet 60, for example. The charge start operation is, for example, an operation on a start switch provided on the EVSE 200 or in the vehicle 1. When the vehicle 1 has a timer charge function to start charging when a preset time arrives, the ECU 100 starts the charge control with the arrival of the preset time serving as a trigger. When the charge start operation is performed, the ECU 100 starts up a system for performing external charging to close the charging relay 70. As a result, electric power supplied from the EVSE 200 can be supplied to the battery 10.

The ECU 100 performs the charge control by outputting a charging power command value to the EVSE 200 via the communication device 80. The ECU 100 outputs the charging power command value to the EVSE 200 at a specified cycle. The EVSE 200 supplies electric power in accordance with the charging power command value to the vehicle 1. The ECU 100 calculates the SOC according to the above equation (1) also when the charge control is performed. SOC(0) in the equation (1) in the charge control is the SOC of the battery 10 at the time when current integration is started. For example, SOC(0) is the SOC of the battery 10 at the time of starting of the charge control (DC charging), that is, the SOC stored in the memory 120.

The ECU 100 executes a termination sequence to end the charge control when a termination condition of the charge control is satisfied. The termination condition of the charge control is, for example, that the calculated SOC has reached a target SOC at the time of charging, or that a preset charging time has elapsed. The target SOC at the time of charging is, for example, the SOC of 100%. The target SOC at the time of charging can be set to any SOC by a setting operation on the vehicle 1 or the EVSE 200.

In the termination sequence, the ECU 100 stores in the memory 120 the SOC at the time of ending of the charge control, which is calculated according to the above equation (1), as the SOC of the battery 10. For example, in the case where the termination condition of the charge control is that the target SOC at the time of charging has been reached, the target SOC at the time of charging is stored in memory 120 as the SOC of the battery 10 when the charging is normally completed. The SOC stored in the memory 120 of the ECU 100 is used as the SOC at the time of starting of the control (travel control, charge control, or discharge control) performed following the current charge control. Then, the ECU 100 shuts down the system for performing external charging to open the charging relay 70, and ends the termination sequence. The SOC at the time of ending of the charge control, which is calculated according to the equation (1), corresponds to an example of the "first charging rate" according to the present disclosure. Further, in the following description, the SOC at the time of ending of the charge control, which is calculated according to the equation (1), is sometimes referred to as "first SOC".

Discharge Control

The ECU 100 starts the discharge control when a discharge start operation is performed with the connector 220 being connected to the inlet 60, for example. The discharge start operation is, for example, an operation on a start switch provided on the EVSE 200 or in the vehicle 1. When the vehicle 1 has a timer discharge function to start discharging when a preset time arrives, the ECU 100 starts the discharge control with the arrival of the preset time serving as a trigger. When the discharge start operation is performed, the ECU 100 starts up the system for performing external discharging to close the charging relay 70. As a result, the electric power of the battery 10 can be supplied to the outside of the vehicle 1 via the EVSE 200.

The ECU 100 performs discharging, for example, with a preset electric power. The ECU 100 notifies the EVSE 200 of the preset electric power via the communication device 80. The ECU 100 discharges the electric power of the battery 10 by supplying the electric power of the battery 10 to the EVSE 200.

In a vehicle grid integration (VGI) system, the vehicle 1 may be used as an energy resource for implementing a virtual power plant (VPP). In this case, receiving a power supply request via the EVSE 200 with the connector 220 being connected to the inlet 60 can be regarded as the discharge start operation. When the discharge start operation is performed, the ECU 100 starts up the system for performing external discharging to close the charging relay 70. As a result, the electric power of the battery 10 can be supplied to the EVSE 200. The ECU 100 discharges the electric power of the battery 10 by supplying the electric power of the battery 10 to the EVSE 200 in response to the power supply request.

In any of the above cases, the ECU 100 calculates the SOC according to the above equation (1) when the discharge control is executed. SOC(0) in the equation (1) in the discharge control is the SOC of the battery 10 at the time when the current integration is started. For example, SOC(0) is the SOC of the battery 10 at the time of starting of the discharge control, that is, the SOC stored in the memory 120.

The ECU 100 executes a termination sequence to end the discharge control when a termination condition of the discharge control is satisfied. The termination condition of the discharge control is that the SOC of the battery 10 has reached the target SOC at the time of discharging, or that a preset amount of electric power has been supplied etc. The target SOC at the time of discharging is set to, for example, the SOC of 20%. The target SOC at the time of discharging can be set to any SOC by a setting operation on the vehicle 1 or the EVSE 200.

In the termination sequence, the ECU 100 stores in the memory 120 the SOC at the time of ending of the discharge control, which is calculated according to the above equation (1), as the SOC of the battery 10. For example, in the case where the termination condition of the discharge control is that the target SOC at the time of discharging has been reached, the target SOC at the time of discharging is stored in the memory 120 as the SOC of the battery 10 when the discharging is normally completed. The SOC stored in the memory 120 of the ECU 100 is used as the SOC at the time of starting of the control (travel control, charge control, or discharge control) performed following the current discharge control. Then, the ECU 100 shuts down the system for performing external discharging, opens the charging relay 70, and ends the termination sequence. The SOC at the time of ending of the discharge control, which is calculated according to the equation (1), corresponds to an example of the "first charging rate" according to the present disclosure. Further, in the following description, the SOC at the time of ending of the discharge control, which is calculated according to the equation (1), is sometimes referred to as "first SOC".

Correction Process

Figure 2:
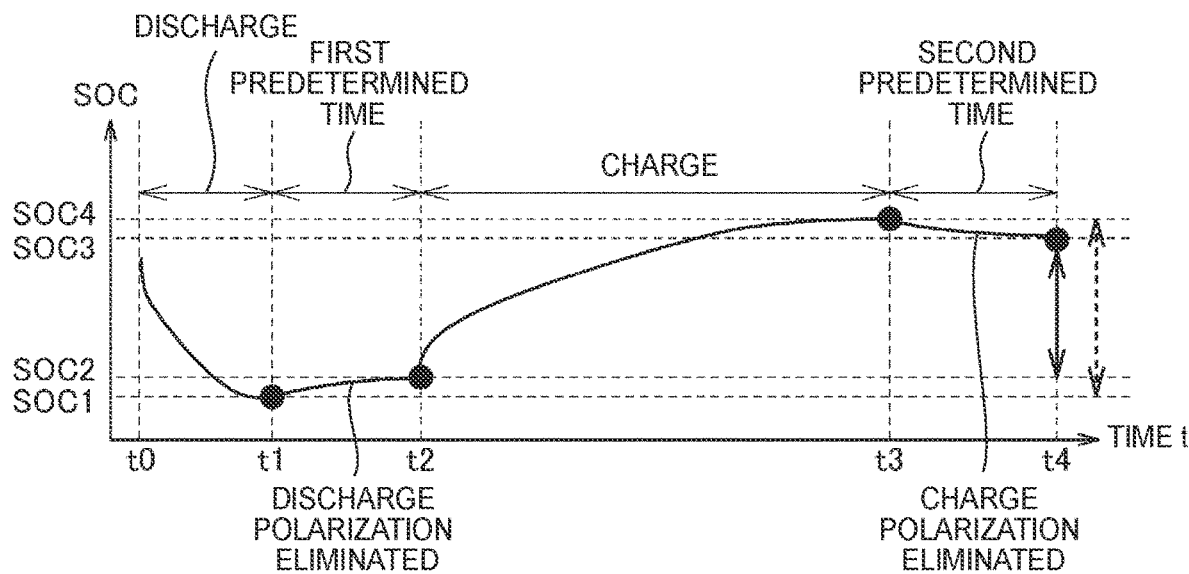
FIG. 2 is a graph for illustrating an example in which a deviation occurs in a state of charge (SOC) due to an influence of polarization.

Here, the SOC calculated at the time of ending of each of the travel control, the charge control, and the discharge control may deviate from the true value due to the influences of calculation errors, polarization caused by charging/discharging, etc. FIG. 2 is a graph illustrating an example in which the deviation occurs in the SOC due to an influence of polarization. In FIG. 2 and the following description, the charge control and the discharge control will be discussed as an example. To the travel control, for example, when electric power of the battery 10 is discharged in the travel control (when the SOC at the time of ending of the travel control is smaller than the SOC at the time of starting of the travel control), the same idea as in the following description regarding the discharge control can be applied. Further, when the battery 10 is charged in the travel control (when the SOC at the time of ending of the travel control is larger than the SOC at the time of starting of the travel control), the same idea as in the following description regarding the charge control can be applied.

In FIG. 2, the horizontal axis represents time and the vertical axis represents the SOC of the battery 10. Referring to FIG. 2, the discharge control is performed from time t0 to time t1. When starting the discharge control at time t0, the ECU 100 acquires the current IB from the monitoring unit 15 and starts current integration. Then, the ECU 100 calculates the SOC of the battery 10 according to the above equation (1).

It is assumed that at time t1 the SOC of the battery 10 has reached SOC1 that is the target SOC at the time of discharging. When the SOC of the battery 10 reaches the target SOC at the time of discharging, the ECU 100 executes the termination sequence to end the discharge control. In the termination sequence, the ECU 100 stores the last calculated SOC, namely, SOC1, in the memory 120 as the SOC of the battery 10. Then, the ECU 100 ends the termination sequence by shutting down the system for performing external discharging.

Here, SOC1 calculated at time t1 may be affected by polarization due to discharging. Generally, polarization due to charging/discharging occurs in a battery. The polarization that occurs in the battery 10 causes an error in the SOC calculated according to the above equation (1). The polarization remains uneliminated until some time (several tens of minutes) elapses after charging/discharging of the battery 10 is ended. In other words, the polarization is eliminated with the passage of time.

It is assumed that the battery 10 is left as is without being charged and discharged during a first predetermined time from time t1 to time t2. The first predetermined time is a time that allows the influence of polarization due to discharging to be eliminated. When the first predetermined time elapses from time t1, the polarization is eliminated at time t2, and the SOC of the battery 10 becomes SOC2 (>SOC1) that is the true value.

As described above, the ECU 100 stores SOC1 in the memory 120 as the SOC of the battery 10 at the time of ending of the discharge control. However, there is a difference between SOC1 and SOC2 that is the true SOC of the battery 10 after polarization is eliminated.

Furthermore, it is assumed that the charge control (DC charging) is started at time t2. The charge control is performed from time t2 to time t3. In the charge control, the ECU 100 reads the SOC of the battery 10 from the memory 120. That is, the ECU 100 reads out SOC1 as the SOC of the battery 10. Further, the ECU 100 acquires the current IB from the monitoring unit 15 and starts current integration. Then, the ECU 100 calculates the SOC of the battery 10 according to the above equation (1).

It is assumed that, at time t3, the SOC of the battery 10 has reached SOC4 that is the target SOC at the time of charging. When the SOC of the battery 10 reaches the target SOC at the time of charging, the ECU 100 executes the termination sequence to end the charge control. In the termination sequence, the ECU 100 stores the last calculated SOC, that is, SOC4, in the memory 120 as the SOC of the battery 10. Then, the ECU 100 shuts down the system for performing external charging and ends the termination sequence.

Here, SOC4 calculated at time t3 may be affected by polarization due to charging. As described above, the polarization is eliminated with the passage of time. Thus, the battery 10 is left as is without being charged and discharged during a second predetermined time from time t3 to time t4, so that the polarization is eliminated. The second predetermined time is a time that allows the influence of polarization due to charging to be eliminated. When the second predetermined time has elapsed from the time t3, the polarization is eliminated at the time t4, and the SOC of the battery 10 becomes SOC3 (<SOC4) that is the true value.

As described above, the ECU 100 stores the SOC 4 in the memory 120 as the SOC of the battery 10 at the time of ending of the charge control. However, there is a difference between SOC 4 and SOC 3 that is the true SOC of the battery 10 after the polarization is eliminated.

Here, it is considered that the full charge capacity FCC of the battery 10 is calculated, for example, according to the following equation (2). For example, in the case of the charge control, $\Delta$SOC represents a difference between the SOC at the time of starting of the charge control and the SOC at the time of ending of the charge control (that is, the SOC change amount), and $\Sigma$IB represents the integrated value of the current IB in the charge control.

$$FCC = \Sigma IB/\Delta SOC \quad (2)$$

For example, taking the charge control in FIG. 2 as an example, $\Delta$SOC is the difference between SOC1 and SOC4. Meanwhile, considering the true value of the SOC with the polarization eliminated, $\Delta$SOC is the difference between SOC2 and SOC3. That is, since there is a difference between the calculated $\Delta$SOC and the true value of $\Delta$SOC, a difference also occurs between the full charge capacity calculated by the equation (2) and the true value of the full charge capacity.

The full charge capacity is an important index for users. The full charge capacity is used, for example, for calculation of the EV cruising range and calculation of the SOC. For example, a user may decide the timing of charging the battery 10 based on the EV cruising range displayed on the display device 95. When the EV cruising range and the like calculated using the full charge capacity deviated from the true value is displayed on the display device 95, the user may cause the vehicle 1 to run out of electricity, for example, which is inconvenient for the user.

As a measure against the above, it is conceivable for example, in a state in which the amount of voltage change due to polarization in external charging has converged, to stop the external charging multiple times to acquire the voltage and to calculate the SOC based on the voltage, as in the power storage system disclosed in JP 2015-121444 A. However, it is not desirable that the time required for the external charging (or discharging) be long. Further, in the travel control, it is difficult to stop the process during execution of the control.

Thus, the estimation system 2 according to the present embodiment corrects the full charge capacity by the correction process instead of calculating the full charge capacity according to the above equation (2). More specifically, when it is determined that the estimated full charge capacity is affected by polarization or the like, the estimation system 2 according to the present embodiment executes the correction process to correct the full charge capacity. As an initial value of the full charge capacity, the full charge capacity of the battery 10 at the time of shipment from the factory, the full charge capacity according to the specifications of the battery 10, or the like can be used. When the vehicle 1 is shipped from the factory, the initial value of the full charge capacity is stored in the memory 120 of the ECU 100. The correction process will be specifically described below.

Figure 3:
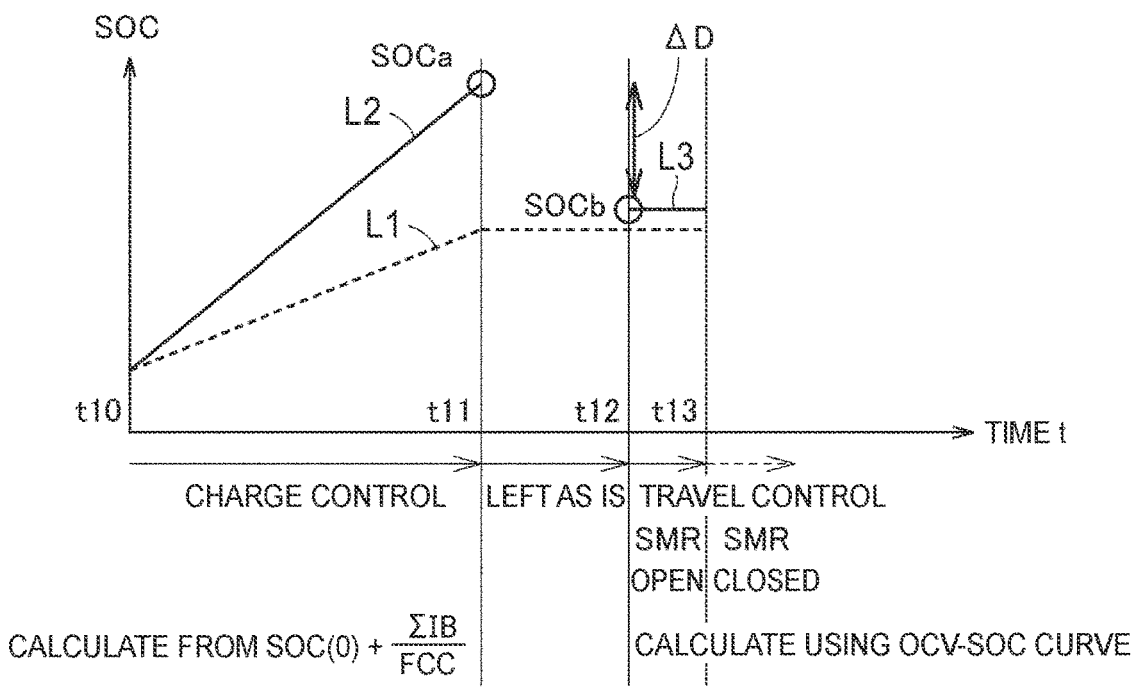
FIG. 3 is a graph for illustrating a correction process.

FIG. 3 is a graph for illustrating the correction process. In FIG. 3, the horizontal axis represents time and the vertical axis represents the SOC of the battery 10. In FIG. 3, the charge control is illustrated. Note that in FIG. 3, the charge control (DC charging) is started at time t10, but for ease of understanding, the SOC of the battery 10 at the time of starting of the charge control (SOC stored in the memory 120) is the same as the true value of the SOC. In FIG. 3, the true value of the SOC is indicated by a dashed line L1, and the SOC calculated according to the above equation (1) in the charge control (DC charging) is indicated by a continuous line L2. Further, in FIG. 3, the SOC calculated using an open circuit voltage to state of charge (OCV–SOC) curve described later is indicated by a continuous line L3.

When starting the charge control at time t10, the ECU 100 starts the current integration. At time t11, when the SOC of the battery 10 reaches the target SOC (SOCa) at the time of charging, the ECU 100 executes the termination sequence to end the charge control. In the termination sequence, the ECU 100 stores in the memory 120 the SOC (first SOC) at the time of ending of the charge control, which is calculated according to the above-described equation (1), that is, SOCa in FIG. 3, as the SOC of the battery 10. Then, the ECU 100 shuts down the system for performing external charging to open the charging relay 70, and ends the termination sequence.

It is assumed that the vehicle 1 is left as is from time t11 to time t12 after that. The time from time t11 to time t12 is equal to or more than the second predetermined time that allows the influence of polarization due to charging to be eliminated. That is, charging and discharging of the battery 10 are not performed from time t11 until the time equal to or more than the second predetermined time elapses. The polarization that has occurred in the battery 10 due to the charging is eliminated with the passage of the second predetermined time.

It is assumed that, at time t12, the user performs the startup operation in order to cause the vehicle 1 to travel. The startup operation starts up the system of the vehicle 1. When the system of the vehicle 1 starts up, the ECU 100 determines whether a predetermined condition is satisfied before closing the SMR 20. The predetermined condition is, for example, that a predetermined time (the first predetermined time or the second predetermined time) has elapsed since the previous control (travel control, charge control or discharge control) is ended. For measuring the time, a timer (not shown) that is always on even when the system of the vehicle 1 is not in operation can be used.

When the predetermined time has elapsed from the time when the previous control is ended, the ECU 100 acquires the voltage VB from the voltage sensor 16 of the monitoring unit 15 with the SMR 20 being in the open state. That is, the ECU 100 acquires the voltage VB from the voltage sensor 16 in a state where no current is flowing through the battery 10. The acquired voltage VB can be regarded as the OCV. This is because of the following reasons. That is, when the voltage VB is acquired in the state where no current is flowing through the battery 10, a voltage drop due to the internal resistance can be suppressed. Further, the polarization that occurs in the battery 10 causes the voltage VB, which is an inter-terminal voltage (CCV) of the battery 10, to deviate from the OCV, but the polarization is eliminated with the passage of the predetermined time since the previous control is ended.

The ECU 100 can obtain the SOC of the battery 10 by matching the voltage VB with the OCV–SOC curve of the battery 10 acquired in advance. The OCV–SOC curve can be created based on experiments or the specifications of the battery 10 and stored in the memory 120 of the ECU 100 as a map in advance.

As shown in FIG. 3, it is understood that the influences of calculation errors due to current integration, polarization, and the like can be suppressed, so that the SOC (continuous line L3) calculated using the OCV–SOC curve has a value close to the true value (SOCb). The SOC of the battery 10 calculated using the voltage VB acquired when the predetermined condition is satisfied and the OCV–SOC curve corresponds to an example of a "second charging rate" according to the present disclosure. In addition, hereinafter, the SOC of the battery 10 calculated using the voltage VB acquired when the predetermined condition is satisfied and the OCV–SOC curve is also referred to as "second SOC".

Here, referring to the above equation (1), when the first SOC deviates from the second SOC by a certain amount or more, it is conceivable that the full charge capacity FCC used for the calculation of the first SOC is deviated from the true value. Thus, in the present embodiment, in the case where the magnitude of the difference between the first SOC calculated in the travel control, the charge control, or the discharge control and the second SOC calculated when the predetermined condition is satisfied exceeds a threshold, the ECU 100 corrects the full charge capacity FCC based on the difference (correction process). The correction process will be specifically described below. The threshold is a value for determining whether the first SOC is affected by calculation errors caused mainly by current integration, polarization, and the like. The threshold can be set in advance based on the results of experiments and the like.

First, a case where the first SOC is calculated in the charge control will be described. As described above, in the travel control, when the battery 10 is charged with electric power (when the SOC at the time of ending of the travel control is larger than the SOC at the time of starting of the travel control), the same idea as in the following description can be applied.

When the magnitude of the difference ΔD between the first SOC and the second SOC (ΔD=first SOC−second SOC) is larger than the threshold and the first SOC is larger than the second SOC (that is, "first SOC−second SOC>threshold" is satisfied), the ECU 100 performs correction to increase the full charge capacity.

With reference to the above equation (1), when the first SOC calculated according to the equation (1) is larger than the second SOC by more than the threshold, it is conceivable that the full charge capacity FCC in the equation (1) is smaller than the true value. In the case of charging, the integrated value ΣIB of the current IB shows a positive value. Therefore, the second term on the right side of the equation (1) indicates a positive value. In this case, the correction is performed to increase the full charge capacity FCC. With the correction to increase the full charge capacity FCC, the full charge capacity FCC can be made close to the true value. Specifically, the full charge capacity FCC is corrected according to the following equation (3).

$$FCC' = FCC + K \times f(\Delta D) \quad (3)$$

K is a so-called smoothing coefficient that takes a value in a range of 0 to 1. The f function is a correction value (>0) determined in accordance with ΔD. The smoothing coefficient K is used in order to suppress the correction value determined in accordance with ΔD from largely affecting the full charge capacity when ΔSOC includes a large error due to a measurement error or the like. The f function can be determined in advance by experiments or the like in consideration of the characteristics of the battery 10. The corrected full charge capacity FCC' is the full charge capacity after being corrected, which in the case of equation (3) is a value increased from the value of the full charge capacity FCC to a value close to the true value.

When the magnitude of the difference ΔD between the first SOC and the second SOC is larger than the threshold and the first SOC is smaller than the second SOC (that is, "second SOC−first SOC>threshold" is satisfied), the ECU 100 performs correction to decrease the full charge capacity.

With reference to the above equation (1), when the first SOC calculated according to the equation (1) is smaller than the second SOC by more than the threshold, it is conceivable that the full charge capacity FCC in the equation (1) is larger than the true value. Therefore, in this case, the correction is performed to decrease the full charge capacity FCC. With the correction to decrease the full charge capacity FCC, the full charge capacity FCC can be made close to the true value. Specifically, the full charge capacity FCC is corrected according to the following equation (4).

$$FCC''=FCC-K\times f(\Delta D) \quad (4)$$

The smoothing coefficient K and the f function are the same as those in the above equation (3). The corrected full charge capacity FCC" is the full charge capacity after being corrected, which in the case of equation (4) is a value decreased from the value of the full charge capacity FCC to a value close to the true value.

Next, a case where the first SOC is calculated in the discharge control will be described. As described above, in the travel control, when electric power is discharged from the battery 10 (when the SOC at the time of ending of the travel control is smaller than the SOC at the time of starting of the travel control), the same idea as in the following description can be applied.

When the magnitude of the difference ΔD between the first SOC and the second SOC is larger than the threshold and the first SOC is larger than the second SOC (that is, "first SOC−second SOC>threshold" is satisfied), the ECU 100 performs the correction to decrease the full charge capacity.

With reference to the above equation (1), when the first SOC calculated according to the equation (1) is larger than the second SOC by more than the threshold, it is conceivable that the full charge capacity FCC in the equation (1) is larger than the true value. In the case of discharging, the integrated value ΣIB of the current IB shows a negative value. Therefore, the second term on the right side of the equation (1) indicates a negative value. In this case, the correction is performed to decrease the full charge capacity FCC. With the correction to decrease the full charge capacity FCC, the full charge capacity FCC can be made close to the true value. Specifically, the full charge capacity FCC is corrected according to the above equation (4).

When the magnitude of the difference ΔD between the first SOC and the second SOC is larger than the threshold and the first SOC is smaller than the second SOC (that is, "second SOC−first SOC>threshold" is satisfied), the ECU 100 performs the correction to increase the full charge capacity.

With reference to the above equation (1), when the first SOC calculated according to the equation (1) is smaller than the second SOC by more than the threshold, it is conceivable that the full charge capacity FCC in the equation (1) is smaller than the true value. Therefore, in this case, the correction is performed to increase the full charge capacity FCC. With the correction to increase the full charge capacity FCC, the full charge capacity FCC can be made close to the true value. Specifically, the full charge capacity FCC is corrected according to the above equation (3).

As described above, even when the full charge capacity deviates from the true value due to the influences of calculation errors caused by current integration, polarization, and the like, it is possible to make the full charge capacity close to the true value by executing the correction process. With the correction process, it is not necessary to perform a process of temporarily stopping the process being executed and acquiring the voltage while the control (travel control, charge control, and discharge control) is being executed, for example. That is, it is possible to accurately estimate the full charge capacity of the battery 10 without increasing the time required for the control. Further, with the correction process, the full charge capacity of the battery 10 can be accurately estimated even when the control is the travel control.

Process Executed by ECU

Figure 4:
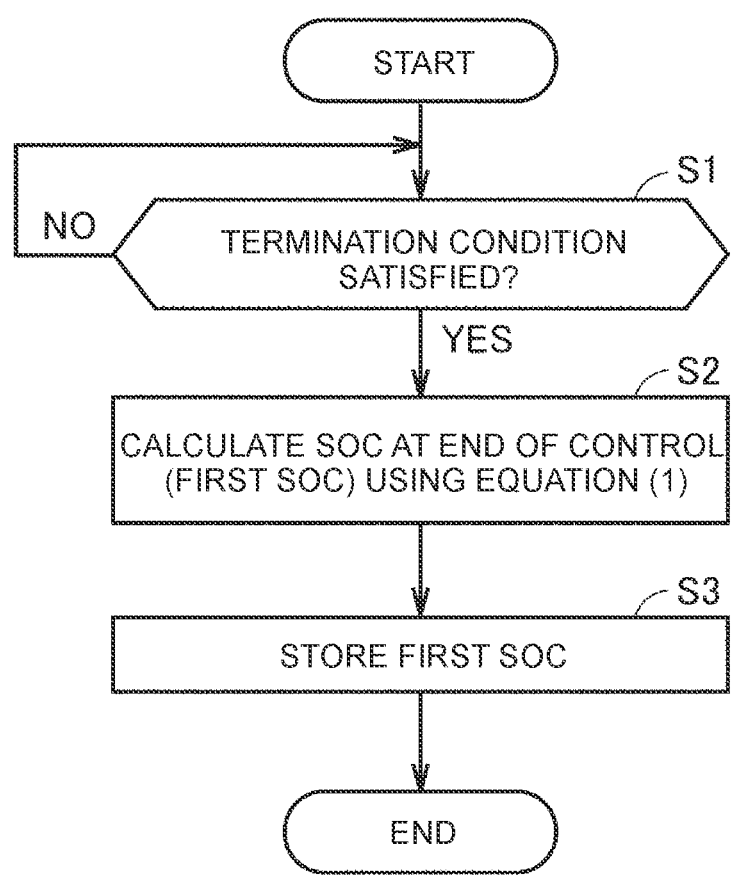
FIG. 4 is a flowchart illustrating a procedure of a process executed by an electronic control unit (ECU) when control (travel control, charge control, or discharge control) is ended.

FIG. 4 is a flowchart illustrating a procedure of a process executed by the ECU 100 when the control (travel control, charge control, or discharge control) is ended. The process of the flowchart of FIG. 4 is started at the time when any of the travel control, the charge control, and the discharge control is started. Each step (hereinafter, step is abbreviated as "S") of the flowcharts of FIG. 4 and FIGS. 5 and 6 described later will be described as a step implemented by software processing by the ECU 100. However, part of or all of the steps may be implemented by hardware (electrical circuit) provided in the ECU 100.

When the control is started, the ECU 100 determines whether the termination condition of the control is satisfied (S1). Specifically, for example, when the charge control is being executed, the ECU 100 determines whether the termination condition of the charge control is satisfied. When the termination condition is not satisfied (NO in S1), the ECU 100 waits until the termination condition is satisfied.

When the termination condition is satisfied, the ECU 100 executes the termination sequence and calculates the SOC at the time of ending of the control (S2). Specifically, the ECU 100 reads, from the memory 120, the current value ΣIB integrated during the execution of the control and the full charge capacity FCC. Then, the ECU 100 uses the current value ΣIB, the full charge capacity FCC, and the above equation (1) to calculate the SOC at the time of ending of the control as the first SOC.

The ECU 100 stores the first SOC calculated in S2 in the memory 120 of the ECU 100 (S3). Then, the ECU 100 ends the process.

Figure 5:
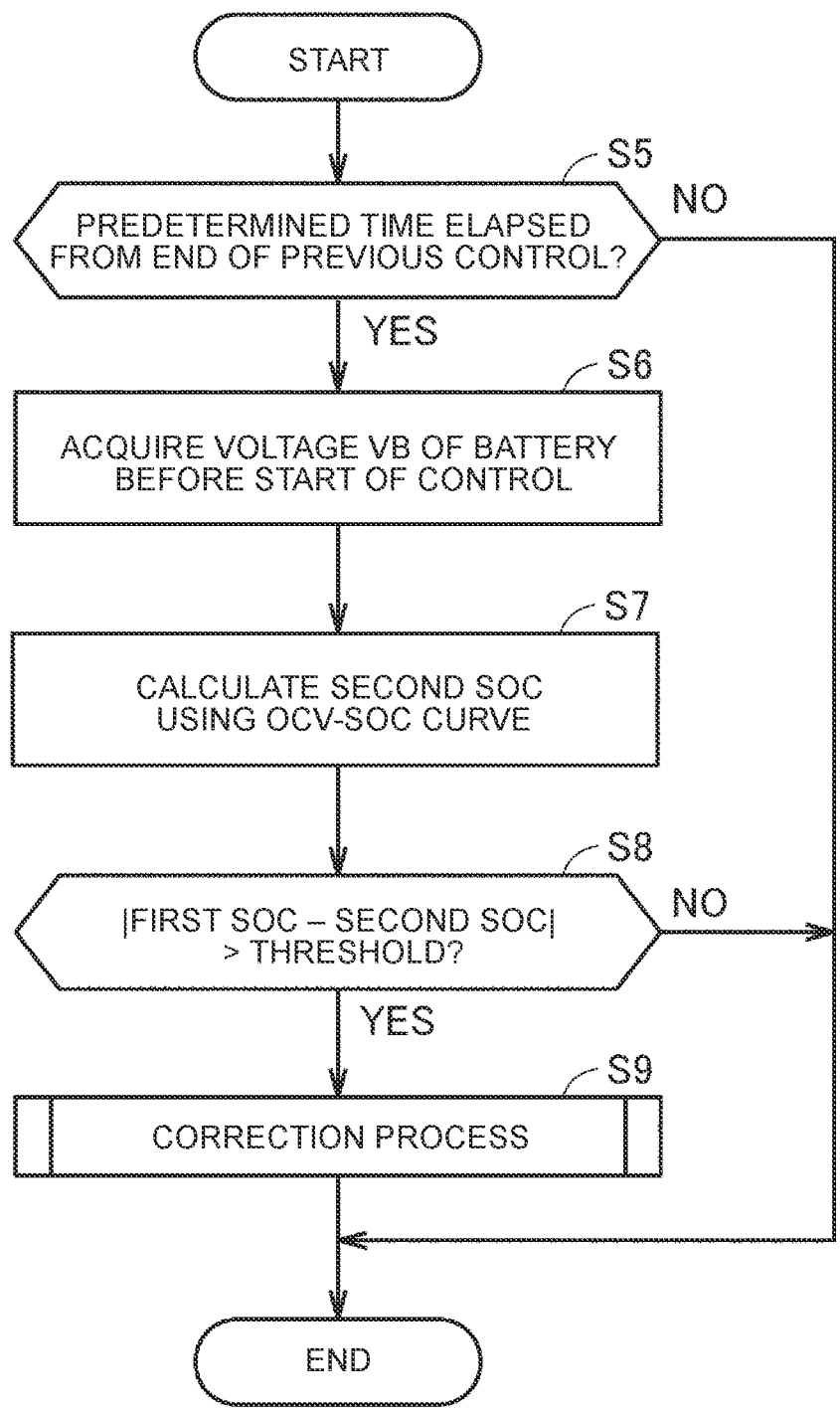
FIG. 5 is a flowchart illustrating a procedure of a process executed by the ECU at the time when the control (travel control, charge control, or discharge control) is started.

FIG. 5 is a flowchart illustrating a procedure of the process executed by the ECU 100 at the time of starting of the control (travel control, charge control or discharge control). The process of the flowchart in FIG. 5 is started when the start operation of any of the travel control, the charge control, and the discharge control is performed.

The ECU 100 determines whether the predetermined time or more has elapsed since the previous control is ended (S5). Specifically, when the previous control is the discharge control, the ECU 100 determines whether the first predetermined time has elapsed since the discharge control is ended. When the previous control is the charge control, the ECU 100 determines whether the second predetermined time has elapsed since the charge control is ended. Further, when the previous control is the travel control and the battery 10 is discharged in the travel control (when the SOC at the time of ending of the travel control is smaller than the SOC at the time of starting of the travel control), the ECU 100 determines whether the first predetermined time has elapsed since the travel control is ended. Further, when the previous control is the travel control and the battery 10 is charged in the travel control (when the SOC at the time of ending of the travel control is larger than the SOC at the time of starting of the travel control), the ECU 100 determines whether the second predetermined time has elapsed since the travel control is ended.

When the predetermined time or more has not elapsed since the previous control is ended (NO in S5), the ECU 100 ends the process. In this case, the SOC is calculated in this control using the full charge capacity FCC stored in the memory 120 in the previous control (equation (1)). As described above, when the vehicle 1 is shipped from the factory, the initial value of the full charge capacity FCC is stored in the memory 120 of the ECU 100. When the correction process has never been executed, the initial value of the full charge capacity FCC is used as the full charge capacity FCC.

When the predetermined time or more has elapsed since the previous control is ended (YES in S5), the ECU 100 acquires the voltage VB of the battery 10 from the voltage sensor 16 of the monitoring unit 15 before starting the current control (S6). When the current control is the travel control, the wording "before starting the current control" means at least before closing the SMR 20. Further, when the current control is the charge control or the discharge control, the wording "before starting the current control" means at least before closing the charging relay 70.

Next, the ECU 100 reads the OCV-SOC curve from the memory 120 and matches the voltage VB obtained in S6 to calculate the second SOC (S7).

The ECU 100 determines whether the magnitude of the difference between the first SOC and the second SOC is larger than the threshold (S8). When the difference between the first SOC and the second SOC is equal to or smaller than the threshold (NO in S8), the ECU 100 ends the process without executing the correction process. In this case, the SOC is calculated in this control using the full charge capacity FCC stored in the memory 120 in the previous control (equation (1)).

When the magnitude of the difference between the first SOC and the second SOC is larger than the threshold (YES in S8), the ECU 100 executes the correction process (S9).

FIG. 6 is a flowchart illustrating a procedure of the correction process. When starting the correction process, the ECU 100 determines whether the control executed when the first SOC was calculated (previous control) is the charge control or the discharge control (S91).

In the case where the control executed when the first SOC was calculated is the charge control, and in the case where the control executed when the first SOC was calculated is the travel control and the battery 10 was charged in the travel control (in the case where the SOC at the time of ending of the travel control is larger than the SOC at the time of starting of the travel control), the ECU 100 determines in S91 that the control executed when the first SOC was calculated is the charge control. In the case where the control executed when the first SOC was calculated is the discharge control, and in the case where the control executed when the first SOC was calculated is the travel control and the battery 10 was discharged in the travel control (in the case where the SOC at the time of ending of the travel control is smaller than the SOC at the time of starting of the travel control), the ECU 100 determines in S91 that the control executed when the first SOC was calculated is the discharge control.

When determining in S91 that the control executed when the first SOC was calculated is the charge control, the ECU 100 determines whether the first SOC read from the memory 120 is larger than the second SOC calculated in S7 (FIG. 5) (S92).

When the first SOC is larger than the second SOC (YES in S92), the ECU 100 performs the correction to increase the full charge capacity FCC according to the above equation (3) (S93). The case where the first SOC is larger than the second SOC in S92 is a case where "first SOC−second SOC>threshold" is satisfied when taking S8 (FIG. 5) into consideration.

On the other hand, when the first SOC is not larger than the second SOC (NO in S92), the ECU 100 performs correction to decrease the full charge capacity FCC according to the above equation (4) (S94). The case where the first SOC is not larger than the second SOC in S92 is a case where "second SOC−first SOC>threshold" is satisfied when taking S8 (FIG. 5) into consideration.

When it is determined in S91 that the control executed when the first SOC was calculated is the discharge control, the ECU 100 determines whether that the first SOC read from the memory 120 is larger than the second SOC calculated in S7 (FIG. 5) (S95).

When the first SOC is larger than the second SOC (YES in S95), the ECU 100 performs correction to decrease the full charge capacity FCC according to the above equation (4) (S96). The case where the first SOC is larger than the second SOC in S95 is a case where "first SOC−second SOC>threshold" is satisfied when taking S8 (FIG. 5) into consideration.

On the other hand, when the first SOC is not larger than the second SOC (NO in S95), the ECU 100 performs correction to increase the full charge capacity FCC according to the above equation (3) (S97). The case where the first SOC is not larger than the second SOC in S95 is a case where "second SOC−first SOC>threshold" is satisfied when taking S8 (FIG. 5) into consideration.

As described above, the estimation system 2 in the present embodiment calculates the first SOC at the time of ending of the control (travel control, charge control, and discharge control). When, at the start of the next control, the predetermined time has elapsed since the previous control is ended (when the predetermined condition is satisfied), the estimation system 2 acquires the voltage VB of the battery 10 to calculate the second SOC before the start of the control. Then, when the magnitude of the difference between the first SOC and the second SOC is larger than the threshold, the estimation system 2 executes the correction process based on the difference between the first SOC and the second SOC to correct the full charge capacity.

As a result, even if the full charge capacity deviates from the true value due to the influences of calculation errors caused by current integration, polarization, and the like, it is possible to make the full charge capacity close to the true value by executing the correction process. With the correction process, it is not necessary to perform a process of temporarily stopping the process being executed and acquiring the voltage while the control (travel control, charge control, and discharge control) is being executed, for example. That is, it is possible to accurately estimate the full charge capacity of the battery 10 without increasing the time required for the control. Further, with the correction process, the full charge capacity of the battery 10 can be accurately estimated even when the control is the travel control.

The embodiments disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. An estimation system, comprising:
 a memory;
 a secondary battery configured to be charged using electric power supplied from an external power source;
 a monitoring device configured to detect a voltage and a current of the secondary battery; and a processor programmed to estimate a full charge capacity of the secondary battery using a detection result of the monitoring device, wherein the processor is programmed to:

retrieve a previously estimated full charge capacity of the secondary battery determined from a previous charge cycle that is stored in the memory;

calculate a first charging rate of the secondary battery using a current integration amount in charging, discharging, or charging and discharging of the secondary battery and using the previously estimated full charge capacity of the secondary battery;

calculate a second charging rate of the secondary battery using an open circuit voltage of the secondary battery, when a predetermined time has elapsed without charging and discharging after the first charging rate is calculated; and perform correction, when a magnitude of a difference between the first charging rate and the second charging rate is larger than a threshold, on the full charge capacity based on the difference.

2. The estimation system according to claim 1, wherein the processor is programmed to perform correction to increase the full charge capacity based on the difference, when the magnitude of the difference is larger than the threshold and the first charging rate is larger than the second charging rate, in a case where the first charging rate is calculated at a time of charging of the secondary battery.

3. The estimation system according to claim 1, wherein the processor is programmed to perform correction to decrease the full charge capacity based on the difference, when the magnitude of the difference is larger than the threshold and the first charging rate is smaller than the second charging rate, in a case where the first charging rate is calculated at a time of charging of the secondary battery.

4. The estimation system according to claim 1, wherein the processor is programmed to perform correction to decrease the full charge capacity based on the difference, when the magnitude of the difference is larger than the threshold and the first charging rate is larger than the second charging rate, in a case where the first charging rate is calculated at a time of discharging of the secondary battery.

5. The estimation system according to claim 1, wherein the processor is programmed to perform correction to increase the full charge capacity based on the difference, when the magnitude of the difference is larger than the threshold and the first charging rate is smaller than the second charging rate, in a case where the first charging rate is calculated at a time of discharging of the secondary battery.

6. The estimation system according to claim 1, wherein the processor is programmed to add a value obtained by dividing the current integration amount by the full charge capacity of the secondary battery that was estimated last time to a charge amount of the secondary battery at a time of starting of control, to calculate the first charging rate.

7. The estimation system according to claim 1, wherein the processor is programmed to calculate the second charging rate using the voltage of the secondary battery before control is started and an open circuit voltage to state of charge curve for the secondary battery.

8. A method for estimating a full charge capacity of a secondary battery, the secondary battery being configured to be charged using electric power supplied from an external power source, the method comprising:

retrieving a previously estimated full charge capacity of the secondary battery determined from a previous charge cycle;

calculating a first charging rate of the secondary battery using a current integration amount in charging, discharging, or charging and discharging of the secondary battery and using the previously estimated full charge capacity of the secondary battery;

calculating a second charging rate of the secondary battery using an open circuit voltage of the secondary battery, when a predetermined time has elapsed without charging and discharging after the first charging rate is calculated; and performing correction, when a magnitude of a difference between the first charging rate and the second charging rate is larger than a threshold, on the full charge capacity based on the difference.

9. The method according to claim 8, wherein in performing correction on the full charge capacity, the correction is performed to increase the full charge capacity based on the difference, when the magnitude of the difference is larger than the threshold and the first charging rate is larger than the second charging rate, in a case where the first charging rate is calculated at a time of charging of the secondary battery.

10. The method according to claim 8, wherein in performing correction on the full charge capacity, the correction is performed to decrease the full charge capacity based on the difference, when the magnitude of the difference is larger than the threshold and the first charging rate is smaller than the second charging rate, in a case where the first charging rate is calculated at a time of charging of the secondary battery.

\* \* \* \* \*